US008840180B2

(12) United States Patent
Itoh et al.

(10) Patent No.: US 8,840,180 B2
(45) Date of Patent: Sep. 23, 2014

(54) TIP-UP SEAT WITH CONCEALED SUPPORT STRUCTURE

(71) Applicant: Toyota Motor Engineering & Manufacturing North America, Inc., Erlanger, KY (US)

(72) Inventors: Daisuke Itoh, Kasugai (JP); Trevor J. DeLanoy, Howell, MI (US); Robert C. Day, Whitmore Lake, MI (US); Vasudeva S. Murthy, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/674,279

(22) Filed: Nov. 12, 2012

(65) Prior Publication Data

US 2014/0132052 A1 May 15, 2014

(51) Int. Cl.
*B60N 2/42* (2006.01)
*B60R 21/00* (2006.01)
*B60N 2/02* (2006.01)
*B60N 2/30* (2006.01)

(52) U.S. Cl.
CPC .................................. *B60N 2/3047* (2013.01)
USPC .................... 297/216.16; 297/216.1; 297/335

(58) Field of Classification Search
CPC .. B60N 2/305; B60N 2/3047; B60N 2/42763; B60N 2/4221; B60N 2/4263; B60N 2/42718; B60N 2/42754; B60R 22/26
USPC ............... 297/216.1, 216.15, 216.16, 216.17, 297/216.19, 335
See application file for complete search history.

(56) References Cited

U.S. PATENT DOCUMENTS

| | | | | |
|---|---|---|---|---|
| 1,451,655 | A * | 4/1923 | Gilley | 297/250.1 |
| 5,005,900 | A * | 4/1991 | Ciampa et al. | 297/216.1 |
| 5,671,948 | A * | 9/1997 | Susko et al. | 280/801.1 |
| 6,598,926 | B1 * | 7/2003 | Price et al. | 296/65.09 |
| 6,742,841 | B1 * | 6/2004 | Soditch et al. | 297/335 |
| 7,040,702 | B2 | 5/2006 | Yamada et al. | |
| 7,086,696 | B2 | 8/2006 | Yudovich | |
| 7,252,320 | B2 | 8/2007 | Tsujibayashi et al. | |
| 7,516,999 | B2 | 4/2009 | Toyota | |
| 7,819,468 | B2 * | 10/2010 | Tsuda et al. | 297/188.1 |
| 8,152,240 | B2 * | 4/2012 | Yamada et al. | 297/321 |

* cited by examiner

*Primary Examiner* — Sarah B McPartlin
(74) *Attorney, Agent, or Firm* — Gifford, Krass, Sprinkle, Anderson & Citkowski, P.C.

(57) ABSTRACT

A vehicle tip-up seat wherein the seat includes a seat back having a front surface, a seat portion having an upper surface and a lower surface. The seat portion is pivotally mounted to the seat back at a first pivot point. An elongated support member extends generally perpendicular to and spaced apart from the lower surface of the seat portion. The elongated support member is fixed to the lower surface of the seat portion. At least one support bracket extends between the elongated support member and the lower surface of the seat portion to support the seat in the event of a crash as seat portion rotates downward. The seat further includes a cushioning foam fully covering the support bracket, the seat portion and the elongated support member.

12 Claims, 2 Drawing Sheets

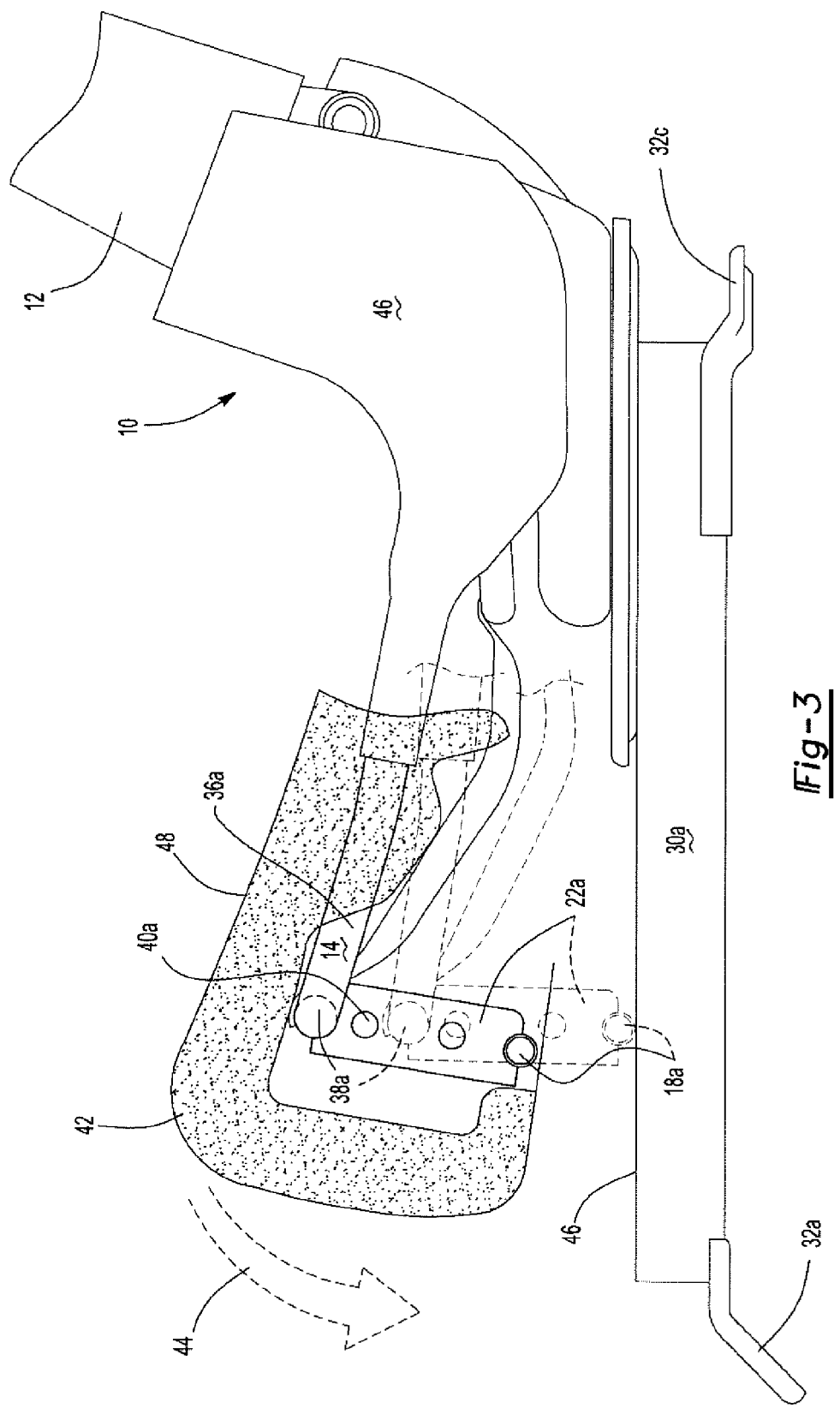

TIP-UP SEAT WITH CONCEALED SUPPORT STRUCTURE

FIELD OF THE INVENTION

This invention relates generally to vehicle seat assemblies, more particularly, this invention relates to a tip-up seat having added support structure.

BACKGROUND OF THE INVENTION

Tip-up seats are frequently used in vehicles, such as rear truck seats, providing the user the opportunity to fold up the seat to provide for more room within the truck interior. These seats are commonly mounted to a rear vehicle cabin wall or to the floor of the vehicle cabin. Since these seats do not provide support underneath the seat, in the event of a crash, the seat portion of the seat rotates downward at a displacement distance which is more than desirable. Accordingly, there exists the need in the art to provide a tip-up seat structure providing a support thereby preventing drastic downward distance displacement on a tip-up seat.

SUMMARY OF THE INVENTION

The present invention provides for an automotive vehicle seat wherein the seat is mounted to a floor or a rear portion of a vehicle interior. The seat includes a tip-up assembly. The seat includes a seat back having a front surface, a seat portion having an upper surface and a lower surface. The seat portion is pivotally mounted to the seat back at a first pivot point. The upper surface of the seat portion moves toward the front surface of the seat back when the seat portion pivots about the first pivot point. An elongated support member extends generally perpendicular to and spaced apart from the lower surface of the seat portion. The elongated support member is fixed to the lower surface of the seat portion. At least one support bracket extends between the elongated support member and the lower surface of the seat portion to support the seat in the event of a crash as seat portion rotates downward. The seat further includes a cushioning foam fully covering the support bracket, the seat portion and the elongated support member.

BRIEF DESCRIPTION OF THE DRAWINGS

FIG. 3 illustrates a side view of the seat assembly wherein the seat portion is rotating downwards during the event of a crash.

DETAILED DESCRIPTION OF THE PREFERRED EMBODIMENTS

Figure 1:
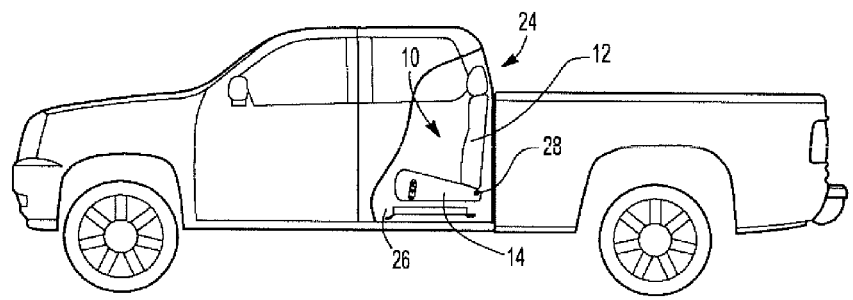
FIG. 1 illustrates a side view of a vehicle having the seat assembly of the present invention.

The present invention provides for a seat assembly 10 having a seat back 12 and a seat portion 14 with a support 16 underneath the seat portion 14 providing support during the event of a crash. The support 16 includes an elongated support member 18 spaced apart from a lower seat portion 20 of the seat portion 14. At least one support bracket 22a, 22b, 22c, 22d is positioned between the elongated support member 18 and the lower seat portion 20. The support brackets 22a, 22b, 22c, 22d and the elongated support member 18 are fixed to the lower seat portion 20 of the seat portion 14 and not pivotal about or in relation to the seat portion 14.

FIG. 1 illustrates a side view of a vehicle 24 having a seat assembly 10 within the vehicle interior 26 of the vehicle 24. The seat assembly 10 includes a seat back 12 and a seat portion 14. In the present embodiment, the seat assembly 10 is mounted to a vehicle floor. The seat portion 14 is operable to pivot about a first pivot pin or point 28 connecting the seat portion 14 to the seat back 12. The seat portion 14 is rotatable about the first pivot pin or point 28 about a first axis.

Figure 2:
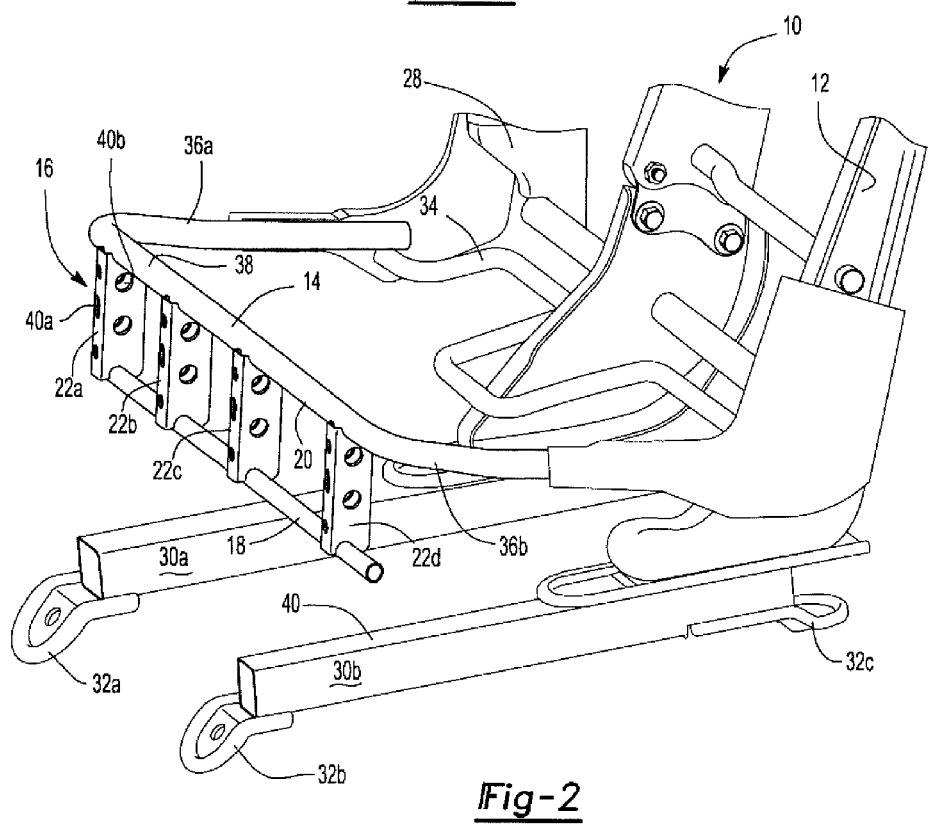
FIG. 2 illustrates a perspective side view of the seat assembly having the elongated member, support brackets and other structural elements not yet covered in the cushioning foam.

FIG. 2 illustrates a perspective side view of the seat assembly 10 mounted to support beams 30a, 30b and brackets 32a, 32b, 32c and subsequently mounted to the floor. The seat assembly 10 includes the seat back 12 and the seat portion 14 wherein the seat portion 14 is pivotally mounted to the seat back 12 by means of the first pivot point 28. The seat assembly 10 further includes various structural support elements such as a support 34.

The seat portion 14 further includes side members 36a, 36b extending between a seat portion support 38 and the seat back 12. The framing which comprises the seat portion 14 is generally tubular and made out of metal. The frame is bent or molded into the correct shape and structure. In the present embodiment, the components are made out of steel but may be made out of various metal elements or plastic, polymer or polymer-like materials.

The seat portion 14 further includes the lower seat portion 20. The lower seat portion 20 is on the seat portion support 38 of the seat portion 14. The support 16 of the seat assembly 10 includes the elongated support member 18 positioned spaced apart from the lower seat portion 20.

A plurality of support brackets 22a, 22b, 22c, 22d extend between the elongated support member 18 and a lower seat portion 20. In the present embodiment, the support brackets 22a, 22b, 22c, 22d are equally spaced apart from one another. In the present embodiment, there are four support brackets. These support brackets 22a, 22b, 22c, 22d are made of a steel material but may be made of various other metals or plastics or polymers depending on the specifications of the seat assembly. The support brackets 22a, 22b, 22c, 22d are generally rectangular. The support brackets 22a, 22b, 22c, 22d include a plurality of apertures 40a, 40h designed to reduce weight, cost and material used in the support brackets 22a, 22b, 22c, 22d.

The support brackets 22a, 22b, 22c, 22d are connected to a lower seat portion 20 of the seat portion 14. The brackets 22a, 22b, 22c, 22d are connected to the lower seat portion 20 by means of welding or other adhesives. The support brackets 22a, 22b, 22c, 22d extend between the lower seat portion 20 and the elongated support member 18. The opposite end of the support bracket connects to the elongated support member 18. The support brackets 22a, 22b, 22c, 22d connect to the elongated support member 18 by means of welding or other adhesives. The support brackets 22a, 22b, 22c, 22d and elongated support member 18 are fixed and not rotatable about the seat portion 14.

FIG. 3 illustrates a side view of the seat assembly 10 having a cushioning foam 42 positioned around the support 16. FIG. 3 further illustrates the downward rotation of the seat portion 14 as shown by a directional arrow 44. In the event of a crash, the motion in force causes the seat portion 14 of the seat assembly 10 to rotate downwards to the floor to contact, or nearly contact, and support beams 30a, 30b of the seat assembly 10. The support 16 of the seat assembly 10 prevents the seat portion 14 of the seat assembly 10 from fully rotating downwards to the support beams 30a, 30b.

FIG. 3 further illustrates the seat back 12 connected to the seat portion 14 at a first pivot point (28 as shown in FIG. 1). A trim cover 46 covers the first pivot point 28 for aesthetic means. FIG. 3 shows the seat portion 14 in a first position and a second position A wherein the second position A is after, or during, a vehicle crash. As the seat portion 14 rotates downward as shown by the directional arrow 44, the elongated member 18A moves towards an upper surface 48 of the support beam 30a, 30b. The support beams 30a, 30b may also be covered by a fabric or carpet floor wherein the elongated member 18A would technically contact the carpet position directly above the upper surface 48 of the support beams 30a, 30b. Without the inclusion of the support 16, the lower seat portion 20 of the seat portion 14 would contact the upper surface 48 of the support beam 30a, 30b. To minimize this distance traveled by the lower seat portion 20 and seat portion 14, the support 16 prevents increased travel of the seat portion 14 towards the upper surface 48 of the support beams 30a, 30b. The downward position is further illustrated by the seat portion support 38A in a downward position. Support bracket 22a is also shown.

In the present embodiment, a cushioning foam 42 fully covers the seat portion 14 and support 16 of the seat portion 14. The cushioning foam 42 conceals the entire support 16 including the elongated member 18, the support brackets 22a, 22b, 22c, 22d, and the seat portion 14. The cushioning foam 42 provides for a comfortable place for a user to sit on the upper surface 48. The cushioning foam 42 may also be covered in a fabric, leather or leather-like material to provide durability and comfort to the user.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A seat for use in a vehicle, the vehicle seat mounted to a floor, the vehicle seat having a tip-up assembly, the seat comprising:

a seat back having a front surface;
a seat portion having an upper surface and a lower surface, the seat portion pivotally mounted to the seat back at a first pivot pin, the upper surface of the seat portion moving towards the front surface of the seat back when the seat portion pivots about the first pivot pin;
an elongated support member extending generally parallel to and spaced apart from the lower surface of the seat portion, the elongated support member fixed to the lower surface, at least one support bracket connecting the elongated support member to the lower surface of the seat portion to support the seat portion in the event of a front end crash as the seat portion moves forward and downward;
the support bracket, the seat portion and the elongated support member being covered with a cushioning foam.

2. The seat of claim 1 wherein the bracket includes a first end and a second end.

3. The seat of claim 2 wherein the first end of the bracket connects to the lower surface of the seat portion.

4. The seat of claim 2 wherein the second end connects to the elongated support member.

5. The seat of claim 2 wherein the elongated support member is an elongated rod.

6. The seat of claim 5 wherein the second end includes a connector to connect to the elongated support member.

7. The seat of claim 1 wherein the elongated support member is spaced apart from the floor.

8. The seat of claim 1 wherein the support bracket, the seat portion and the elongated support member are fully concealed by the cushioning foam.

9. The seat of claim 1 wherein the seat further includes at least one support beam positioned under the seat portion.

10. The seat of claim 9 wherein the at least one support beam includes an upper surface.

11. The seat of claim 10 wherein elongated support member contacts the upper surface of the support beam during rotation of the seat portion.

12. The seat of claim 10 wherein the elongated support member nearly contacts the upper surface of the support beam during rotation of the seat portion.

* * * * *